(12) United States Patent
Tzidon et al.

(10) Patent No.: US 10,581,061 B2
(45) Date of Patent: Mar. 3, 2020

(54) SYSTEM AND METHOD FOR METAL-AIR ANODE RENOVATION

(71) Applicant: PHINERGY LTD., Lod (IL)

(72) Inventors: Aviv Tzidon, Tel Aviv (IL); Vital Peretz, Herzlia (IL); Avraham Yadgar, Kiryat Ono (IL); Dekel Tzidon, Hod Hasharon (IL)

(73) Assignee: PHINERGY LTD, Lod (IL)

( * ) Notice: Subject to any disclaimer, the term of this patent is extended or adjusted under 35 U.S.C. 154(b) by 111 days.

(21) Appl. No.: 15/396,841

(22) Filed: Jan. 3, 2017

(65) Prior Publication Data

US 2018/0191044 A1    Jul. 5, 2018

(51) Int. Cl.
*H01M 12/06* (2006.01)
*H01M 4/12* (2006.01)
*H01M 10/42* (2006.01)
*H01M 4/04* (2006.01)
*H01M 4/02* (2006.01)

(52) U.S. Cl.
CPC ............. *H01M 4/12* (2013.01); *H01M 4/043* (2013.01); *H01M 10/4242* (2013.01); *H01M 12/065* (2013.01); *H01M 2004/028* (2013.01)

(58) Field of Classification Search
CPC ........... H01M 10/4242; H01M 12/065; H01M 2004/028; H01M 4/043; H01M 4/12; H01M 6/5077; H01M 2/025
See application file for complete search history.

(56) References Cited

U.S. PATENT DOCUMENTS

| 3,759,748 A * | 9/1973 | Palmer ................. H01M 12/08 429/403 |
| 3,847,671 A | 11/1974 | Leparulo et al. |
| 4,389,466 A | 6/1983 | Joy |

(Continued)

FOREIGN PATENT DOCUMENTS

WO    WO 2017110880 A1    6/2017

OTHER PUBLICATIONS

International Search Report of Application No. PCT/IL2017/051407 dated Mar. 28, 2018.

*Primary Examiner* — Stewart A Fraser
*Assistant Examiner* — Victoria H Lynch
(74) *Attorney, Agent, or Firm* — Pearl Cohen Zedek Latzer Baratz LLP (57) ABSTRACT

A method for renovation of a consumed anode in a metal-air cell without dismantling the cell comprises circulating electrolyte through the cell to evacuate used slurry from the cell, circulating electrolyte with fresh slurry into the cell and allowing sedimentation of the fresh slurry inside the cell to form an anode and compacting the slurry to reduce the gaps between its particles. A meta-air cell enabling renovation of a consumed anode without dismantling the cell defining first outer face of the cell, air cathode layer adjacent the porous wall, separator wall disposed on the inner face of the air cathode layer, cell space volume to contain electrolyte and metal granules slurry, current collector layer to form an anode, made of current conductive material disposed in the space and flexible wall defining a second outer face of the cell wherein the flexible wall is adapted to be pushed towards inside of the cell subject to pressure applied to its outer face, thereby to reduce the volume of the space.

10 Claims, 8 Drawing Sheets

(56) References Cited

U.S. PATENT DOCUMENTS

| | | | |
|---|---|---|---|
| 4,491,624 | A | 1/1985 | Sarbacher et al. |
| 5,849,427 | A | 12/1998 | Siu et al. |
| 5,952,117 | A | 9/1999 | Colborn |
| 6,296,958 | B1 | 10/2001 | Pinto et al. |
| 2004/0038120 | A1* | 2/2004 | Tsai .................... H01M 12/065 429/66 |
| 2011/0195321 | A1* | 8/2011 | Takahashi ............. H01M 4/382 429/403 |
| 2016/0111705 | A1* | 4/2016 | Kisdarjono ............. H01M 4/38 429/406 |
| 2017/0229750 | A1 | 8/2017 | Brown |

* cited by examiner

SYSTEM AND METHOD FOR METAL-AIR ANODE RENOVATION

BACKGROUND OF THE INVENTION

During the operation of a metal-air cell the metallic anode in the cell is consumed and change to oxide form. As is known in the art in order to resume operation of the cell, the exhausted anode unit is removed from the cell and a new anode unit is inserted. Similarly, the exhausted electrolyte in the cell may be replaced.

Known methods for replacement of the anode and/or the electrolyte involve draining the used electrolyte, opening the cell's sealing, pulling the consumed anode, placing a new anode unit inside the cell, re-sealing the cell and refilling fresh electrolyte. This process is lengthy and cumbersome.

There is a need for method and means enabling fast restoration of a metal-air cell without opening the cell.

SUMMARY OF THE INVENTION

A method for renovation of a consumed anode in a metal-air cell without dismantling the cell according to embodiments of the present invention is disclosed comprising circulating electrolyte through the cell to evacuate used slurry from the cell, circulating electrolyte with fresh slurry into the cell and allowing sedimentation of the fresh slurry inside the cell to form an anode and compacting the slurry to reduce the gaps between its particles.

In some embodiments the compacting of the slurry is carried out by means of pressurized balloon/layer positioned between two adjacent cells. In some embodiments the pressurized balloon/layer is disposed between two adjacent anode sides of two adjacent cells. In some embodiments the pressurized balloon/layer is disposed between the anode side of one cell and cathode side of an adjacent cell.

In some embodiments the method comprising supplying oxygen to the cathode by means of at least one of perforated balloon and porous layer.

In some embodiments the pressure is controlled by means of at least one of pressure sensor and sensed conductivity between the slurry and the current collector.

A meta-air cell enabling renovation of a consumed anode without dismantling the cell according to embodiments of the present invention is disclosed comprising porous wall disposed at the cathode outer face of the cell and defining first outer face of the cell, air cathode layer adjacent the porous wall, separator wall disposed on the inner face of the air cathode layer, cell space volume to contain electrolyte and metal granules slurry, current collector layer to form an anode, made of current conductive material disposed in the space and flexible wall defining a second outer face of the cell wherein the flexible wall is adapted to be pushed towards inside of the cell subject to pressure applied to its outer face, thereby to reduce the volume of the space.

A metal-air cell set according to embodiments of the present invention is disclosed comprising plurality of metal-air cells, each of the metal cells comprising at least porous wall disposed at the cathode outer face of the cell and defining first outer face of the cell, air cathode layer adjacent the porous wall, separator wall disposed on the inner face of the air cathode layer, cell space volume to contain electrolyte and metal granules slurry, current collector layer to form an anode, made of current conductive material disposed in the space and flexible wall defining a second outer face of the cell, wherein the flexible wall is adapted to be pushed towards inside of the cell subject to pressure applied to its outer face, thereby to reduce the volume of the space. The metal-air cell set further comprising an inflatable element disposed between at least to adjacent metal-air cells, adapted to apply pressure onto the flexible wall, thereby to reduce the volume of the cell.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Typically, a used metal-air cell contains, additional to the used electrolyte, oxygenated residuals of the anode that may accumulate on the bottom of the cell case or reside as slurry in the electrolyte. According to embodiments of the present invention the restoration of a metal-air cell does not involve dismantling of the used cell, and does not involve removal of the used anode from the used cell. According to embodiments of the present invention the used cell remains tightly and leak-proof closed.

Figure 1A:
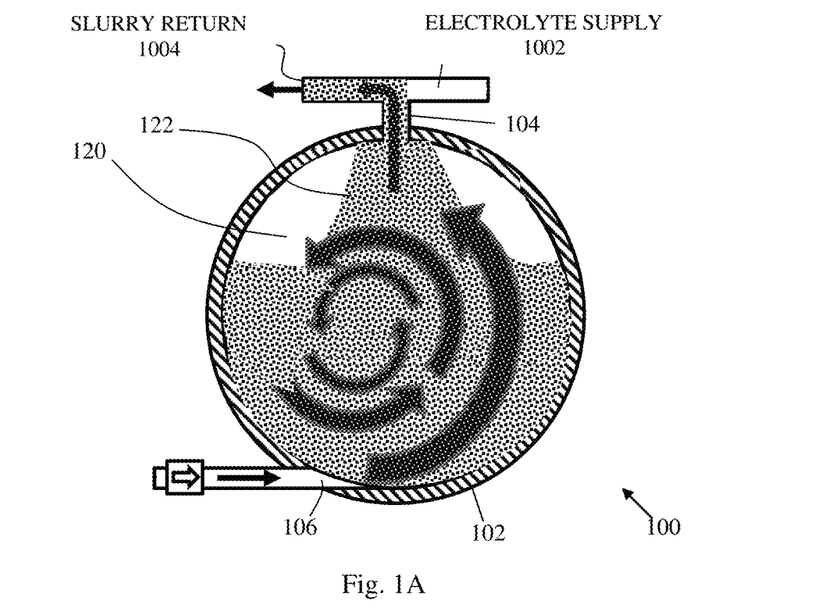
FIGS. 1A-1C schematically depict three stages of a process of removal of used electrolyte and slurry from a metal-air cell, in three consecutive steps, according to embodiments of the present invention.
Figure 1B:
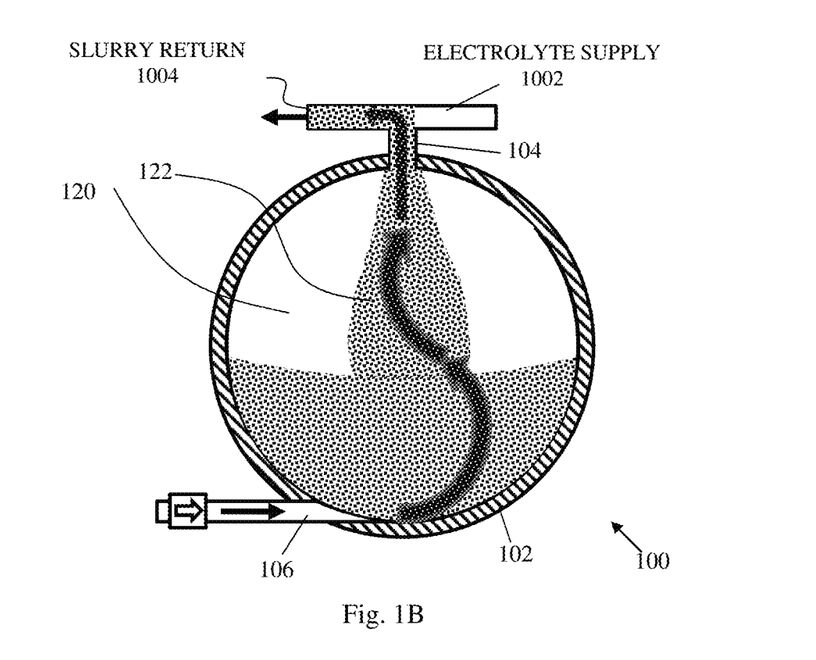
Figure 1C:
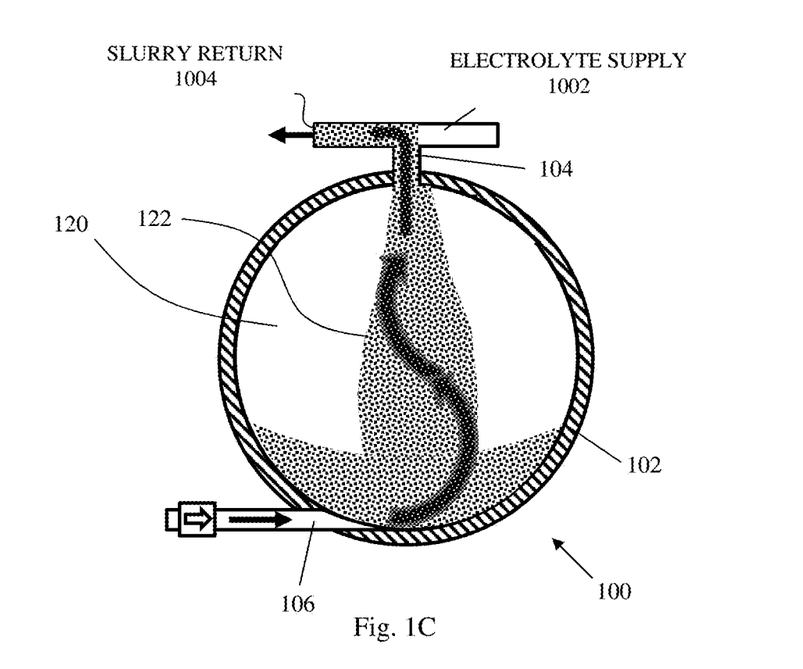

Reference is made now to FIGS. 1A-1C, which schematically depict three stages of a process of removal of used electrolyte and slurry from metal-air cell 100, in three consecutive steps, according to embodiments of the present invention. Metal-air cell 100 comprise of cell case 102, cell electrolyte and slurry refill/removal opening 104, electrolyte inlet 106, fresh electrolyte and fresh slurry supply tube 1002 and electrolyte and slurry return tube 1004. Cell case 102 is liquid-tight closed, allowing flow in and/or out only via openings 104 and 106, which may be controlled to open or close according to the steps described below. Fresh electrolyte and fresh metal granules slurry may be kept in a respective container (not shown) and may be provided, in a proper timing, via tube 1002. Tube 1004 may be used for flowing away from case 102 excess fresh electrolyte and slurry or used electrolyte and slurry, as explained below. Inlet 106 may be used to provide fresh electrolyte from a fresh electrolyte container (not shown) into cell case 102. Cell case 102 may contain used electrolyte 120 with used metal granules slurry 122. When removal of used electrolyte and slurry is required the used electrolyte and the used slurry may be pumped out of cell case 102 by circulating fresh electrolyte via inlet 106 and by allowing the content of cell case 102 to flow out via tube 1004. At this stage tube 1002 is closed. Urged flow of fresh electrolyte is pumped into cell case 102 and used electrolyte 220 with used slurry 122 is forced out from cell case 102 via opening 104 and tube 1004. The flow of fresh electrolyte via opening 106 may cause turbulence flow inside cell case 102 and crumble the anode particles, as depicted in FIGS. 1A, 1B and 1C, where the content of used slurry 122 in the mixed electrolyte inside cell case 102 gradually reduces until substantially all of the used slurry is removed from cell case 102 and the case is filled with substantially only fresh electrolyte. According to some embodiments one or more sensors may be used to determine when used slurry 122 and used electrolyte 120 have been sufficiently removed from cell case 102. Such sensors may be flow rate sensor, transparency/opacity/turbidity sensor, viscosity sensor, etc.

Figure 2A:
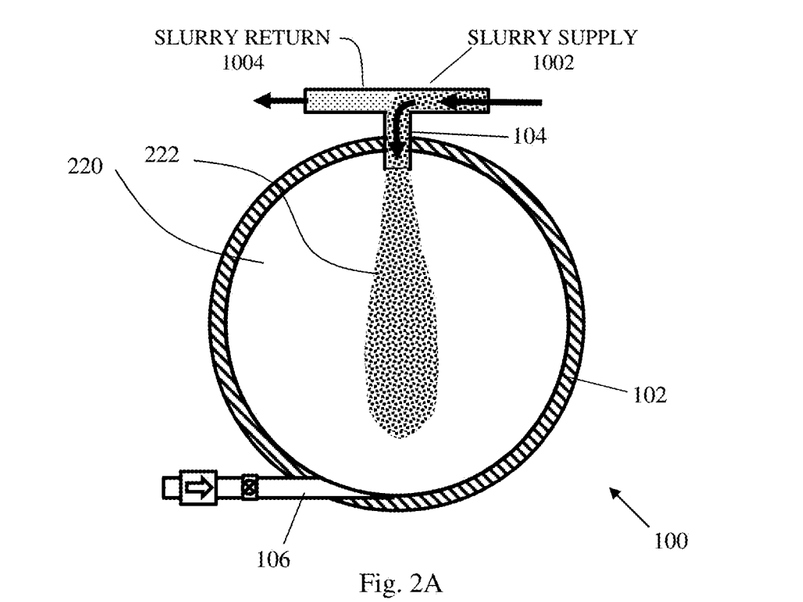
FIGS. 2A-2C schematically depict three consecutive stages, respectively, of a process of reloading of fresh electrolyte and fresh slurry into a metal-air cell according to embodiments of the present invention.
Figure 2B:
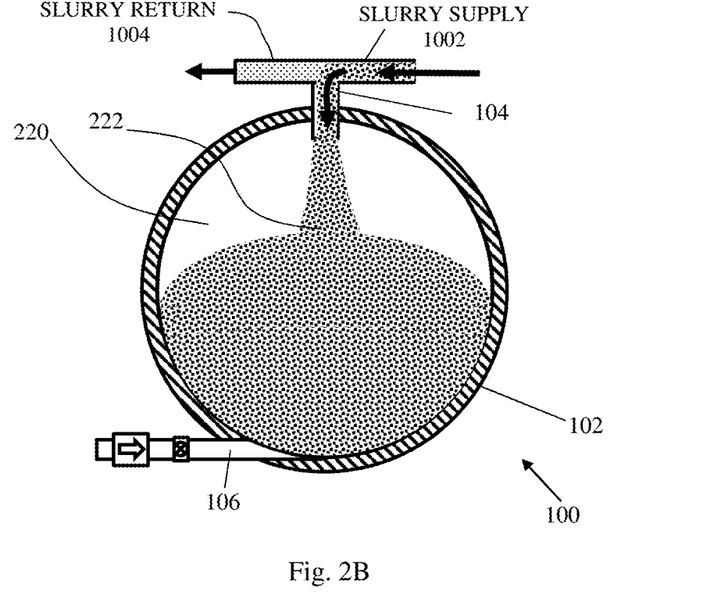
Figure 2C:
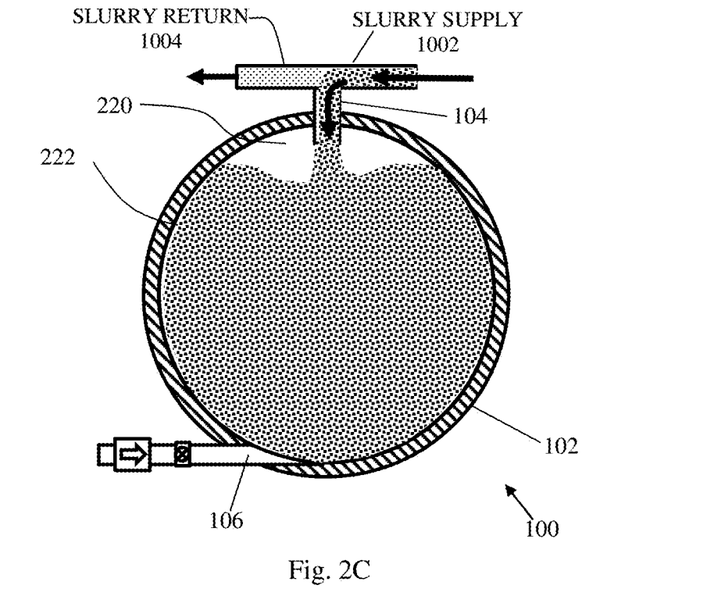

When used electrolyte and/or used slurry have been sufficiently removed from cell case 102, the battery controller starts refilling of fresh electrolyte loaded with fresh granules of metal of the material type usable as an anode in cell 102. The fresh metal granules comprise mainly unoxygenated metal granules. The fresh metal granules may reside in the fresh electrolyte in the form of slurry so that it may be carried along with a flow of the electrolyte, preferably at least partially suspended in the optionally circulated/steered electrolyte with certain tendency to sink with the force of gravity. Reference is made now to FIGS. 2A-2C, which schematically depict three consecutive stages of a process of reloading of fresh electrolyte and fresh slurry into metal-air cell 100, and thus reloading and renovating the anode in the metal air cell/battery, according to embodiments of the present invention. Fresh electrolyte 220 with suspended fresh metal granules 222 in slurry form may be pumped, circulated or otherwise be urged via supply tube 1002 flowing over the inlet of opening 104 thereby at least some amount of the suspended slurry 222 enters case 102 and sinks in it. Due to the tendency of slurry 222 to sink, the growing volume it gradually occupies inside cell case 102, as seen in FIGS. 2A, then 2B and finally 2C, forces corresponding volume of fresh electrolyte 220 to leave cell case 102 and flow via return tube 1004 towards a respective container. Return tube 1004 is also used for receiving the excess amount of electrolyte with slurry that does not flow from supply tube 1002 into cell case 102, in order to direct it to the respective container (not shown). The stage of refilling cell case 102 with fresh electrolyte and fresh metal granules slurry may be stopped based on pre-defined time of circulation or one or more of the following indications— weight of fresh granules that were taken from the container of fresh electrolyte and fresh slurry, conductivity between the slurry particles and the current collector or any other dedicated probe, flow rate sensor, transparency/opacity/turbidity sensor, viscosity sensor etc.

It will be noted that the removal of the used electrolyte with used metal slurry may be into a respective container (not shown) as is known in the art. It will also be noted that fresh electrolyte usable for the removal of used electrolyte and used metal slurry, as described above with regard to FIGS. 1A-1C, may be kept in a suitable container (not shown) as is known in the art, and may be provided to cell case 102 for the removal used electrolyte and used slurry by a suitable pump or similar means, as is known in the art. It will also be noted that fresh electrolyte with suspended fresh metal slurry may be kept in a suitable container (not shown) which may be provided with agitating means such as revolving agitator or agitating flow.

According to embodiments of the present invention after slurry 220 is settled inside the cell, tubes 1002, 1004, 104 and 106 may be closed, leaving cell case 102 filled with fresh electrolyte and fresh metal granules slurry, or may be deliberately kept open to allow compensation for changes in volume.

The fresh slurry that was refilled in cell case 102 may be used for re-forming and renovating the consumed anode in the metal-air cell, according to embodiments of the present invention, as described herein below.

According to embodiments of the present invention renovation of a consumed anode may be carried out by providing fresh (with some remaining of oxygenated particles) metal granules slurry with fresh electrolyte and urging relatively large amount of metal granules to get in high conductivity contact with current collector disposed in the cell. The metal granules may be co compressed onto the current collector thereby forming with the current collector an anode. In order to achieve this target, pressure may be applied on the slurry, preferably from an outer side of the cell that is farther from the side of the cathode, squeezing and reducing the electrolyte quantity inside the cell, from between the particles, and improving the conductivity between the metal/conductive particles and between the particles and the current collector.

The examples of cells depicted in FIGS. 1A-1C and 2A-2C are illustrated with a circular dimension in one of their 3D dimensions, however it would apparent to those skilled in the art that cells operative according to embodiments of the present invention may have other forms or shapes in that dimension, such as rectangular or square shape without deviating from the scope of the embodiments of the invention described here.

Figure 3:
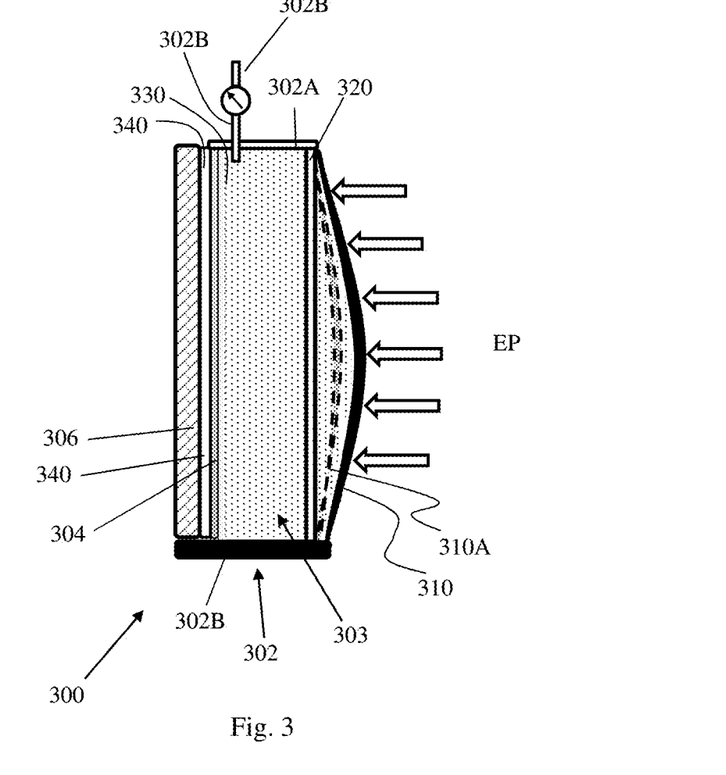
FIG. 3 is a schematic illustration of a metal-air cell enabling re-forming of an anode, according to embodiments of the present invention.
Figure 3A:
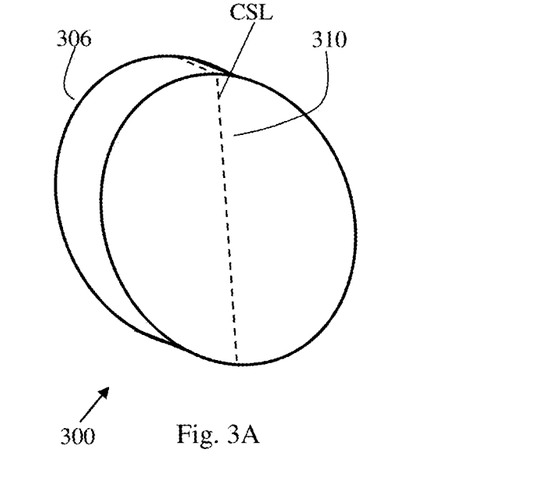
FIGS. 3A and 3B are views depicting cross section lines of the view of FIG. 3, in a rectangular and a circular metal-air cell, respectively.
Figure 3B:
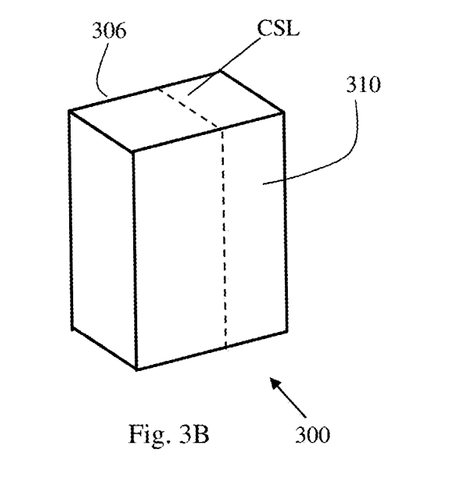

Reference is made now to FIG. 3, which is a schematic cross section illustration of metal-air cell 300 enabling re-forming of anode, according to embodiments of the present invention. The cross section is made along lines CSL marked by dashed lines in circular shape (FIG. 3A) and rectangular shape (FIG. 3B). Cell 300 comprises a liquid sealed space volume 303 confined in cell shell 302 cell bottom 302B, cell top 302A, cathode wall 340 and flexible/compressible wall 310. Separator wall 304 may be made, as is known in the art, for separating between electrolyte and slurry residing in space 303 and air cathode 340 located on the outer side of separator wall 304, allowing only electrolyte and thus electrical flow through it. On the other side of air cathode 340 porous support wall 306 may be disposed. Porous wall 306 may be made of material that provides sufficient mechanical support for air cathode 340 and for separator wall 304, to be able to stand against pressures developing in cell 300. Porous support wall 306 may further be made of material that may enable passage of gas through it, for example in order to provide air to cathode 340. Current collector 320 may be disposed inside space 303. Current collector 320 may be made of metal or other material with high conductivity and may be formed as wire mesh with mesh holes big enough to allow free flow of electrolyte and slurry through the holes back and forth, while enabling adjoining of metal granules in a slurry onto current collector 320, as explained herein below, according to embodiments of the present invention. Cell case 302 may be equipped with internal pressure control means 302B, which may be any kind of pressure relief and/or control enabling setting the required level of pressure inside cell case 300 when for example the volume of the cell case and/or the volume of the electrolyte and slurry in the cell case changes. For example, if the internal volume of cell case 300 decreases due to, for example, external pressure EP that is exerted on flexible wall 310, that pushes it inwardly so that the movement of wall 310 to position 310A wall and as a result the inner space 303 is decreased. According to some embodiments pressure maintaining means, such as pressure control means 302B, may cause the pressure built inside cell case 302 to rise to a defined level. The rising pressure and the decreasing volume may cause certain amount of the electrolyte to be squeezed from the slurry, thereby raising the relative content of fresh slurry in the electrolyte. Further, at least some of the slurry may be adjoined onto current collector 320, and in general, reducing the distances between granules of metal in the slurry and therefore reducing the overall electrical resistance in a current path from current collector 320 towards cathode 340 via electrolyte and slurry in space 303. Another method of controlling the amount of pressure required is to measure the conductivity between the current collector and the cathode or additional electrode (not shown) inserted in the slurry space 303.

Space 303 may be thus filled with fresh electrolyte and fresh metal granules slurry 330 as explained above with regard to FIGS. 2A-2C. When sufficiently filled, external pressure EP may be exerted onto flexible wall 310, compacting space 303 as explained also in details herein below. According to some embodiments, the pressure EP exerted on flexible wall 310 induces same pressure inside space 303. If required the resultant pressure in space 303 may be controlled to be equal, to not exceed or to be lower than a predefined pressure level. The pressure inside space 303 may be controlled and/or measured by pressure regulator/pressure gauge 302B, as is known in the art.

A cycle of: applying external pressure EP on flexible wall 310, squeezing certain amount of electrolyte out of the slurry in the cell case and out of the cell case thereby increasing the relative content of metal granules in the slurry, releasing the external pressure and allowing cell case 303 regain greater volume due to the retreat of flexible wall 310, and compensating for loss of electrolyte by providing additional amount of fresh electrolyte with fresh metal granules slurry may be repeated as many times as needed. For example, according to embodiments of the present invention this cycle may be repeated until the rising amount of metal granules increases the electrical conductivity, between current collector 320 and cathode 340 or additional electrode (not shown) inserted in the slurry space 303, above predefined level. The method described above, for rising the relative content of metal granules in the fresh electrolyte slurry may be applied to metal-air unit comprising plurality of cells, such as cell 300.

Flexible wall 310 may also be used to compensate for changes in the pressure build up inside the cell due to the volume change resulting from transformation of metal to metal-oxide during operation of the cell.

Figure 4:
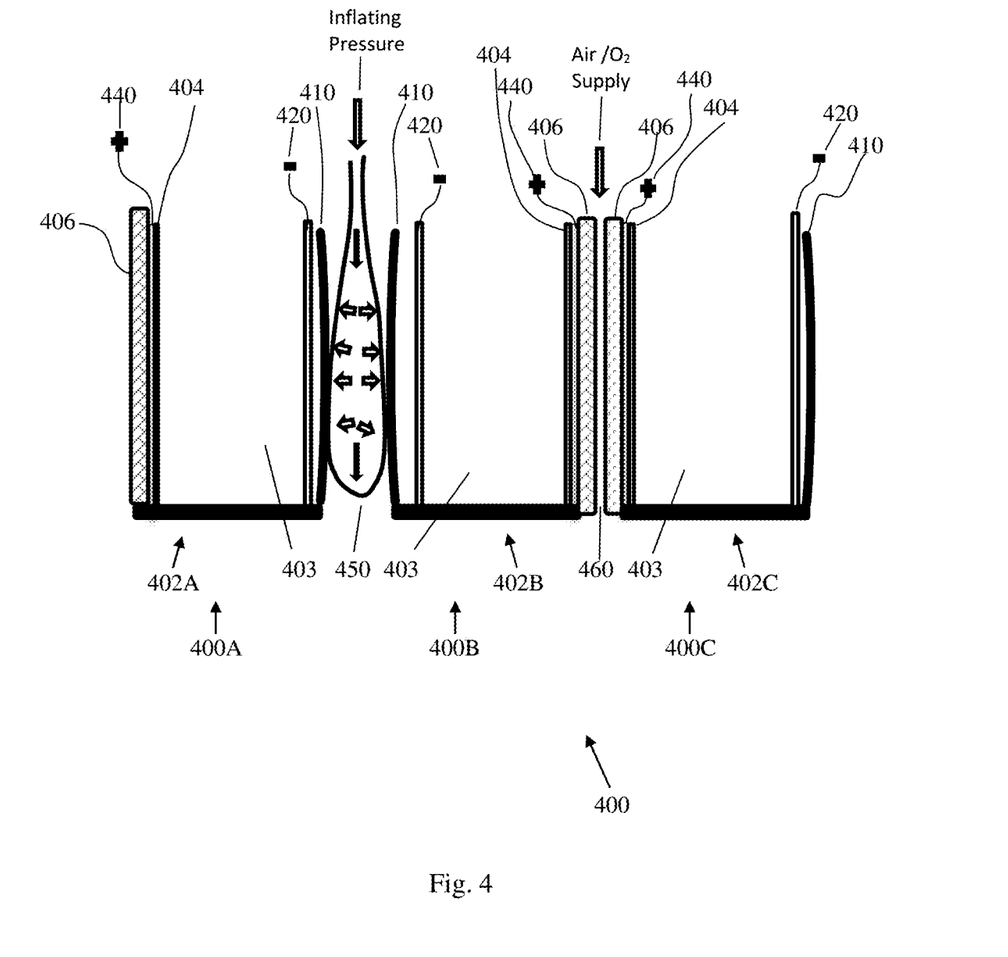
FIG. 4 schematically presenting a set of metal-air cells, according to embodiments of the present invention.

Reference is made now to FIG. 4, schematically presenting a set of metal-air set of cells 400, according to embodiments of the present invention. Cells set 400 may comprise plurality of cells 400A, 400B, 400C etc. Each one of cells 400A, 400B, 400C may be built and operative similar to cell 300 of FIG. 3, with required changes, as is described in details below. Cells 400A, 400B, 400C, etc. may be positioned with respect to each other side-by-side-by-side in at least two different arrangements: anode-to-anode (or cathode-to-cathode), and anode-to-cathode. Cells set 400 of FIG. 4 is schematically arranged in an anode-to-anode (ATA) arrangement. Cells 400A-400C are presented in an empty stage, containing very little or none electrolyte and slurry.

Each of cells 400A-400C comprises liquid sealed space 403 confined in a cell shell as described above between cell bottom 402, cell top (not shown to not obscure the drawing), separator wall 404 and cathode wall 440. Separator wall 404 may be made, as is known in the art, for separating between electrolyte and slurry residing in space 403 and air cathode 440 located on the outer side of separator wall 404, allowing only electrolyte and electrical flow through it. On the other side of air cathode 440 porous support wall 406 may be disposed. Porous wall 406 may be made of material that provides sufficient mechanical support for air cathode 440 and for separator wall 404, to be able to stand against pressures developing in cell 400A/400B/400C. Porous support wall 406 may further be made of material that may enable passage of gas through it, for example in order to provide air to cathode 440. Current collector 420 may be disposed inside space 403. Current collector 420 may be made of metal or other material with high electrical conductivity and may be formed as wire mesh with mesh holes big enough to allow free flow of electrolyte and suspended slurry through the holes back and forth, while enabling adjoining of metal granules in a slurry onto current collector 420, as explained herein below, according to embodiments of the present invention. According to some embodiments current collector 420 may be made of flexible sheet of metal placed adjacent to the flexible wall 410 allowing external pressure EP to compact the slurry inside volume 403

Between each pair of adjacent cells being disposed anode-to-anode, such as cells 400A and 400B, having their flexible walls 410 facing each other, a pressure applying element, such as inflatable pressurizing element 450 may be disposed in a manner that causes applying of pressure on the outer face of flexible walls 410 when being inflated. In some embodiments pressurizing element 450 may be a balloon disposed between adjacent flexible walls 410. Balloon 450 may have its inflating opening located in a place with regard to the outer envelopes of cell 402A and 402B so that it will be easy to connect it to inflating means. Balloon 450 may be adapted to be inflated with liquid or gas, for example, balloon 450 may be adapted to be inflated by pressurized liquid, e.g. water, or by pressurized gas, e.g. air.

Between each of the other type of pairs of adjacent cells, being disposed cathode-to-cathode, gas supply space 460 may be disposed, enabling supply of oxygen carrying gas such as air.

Figure 5A:
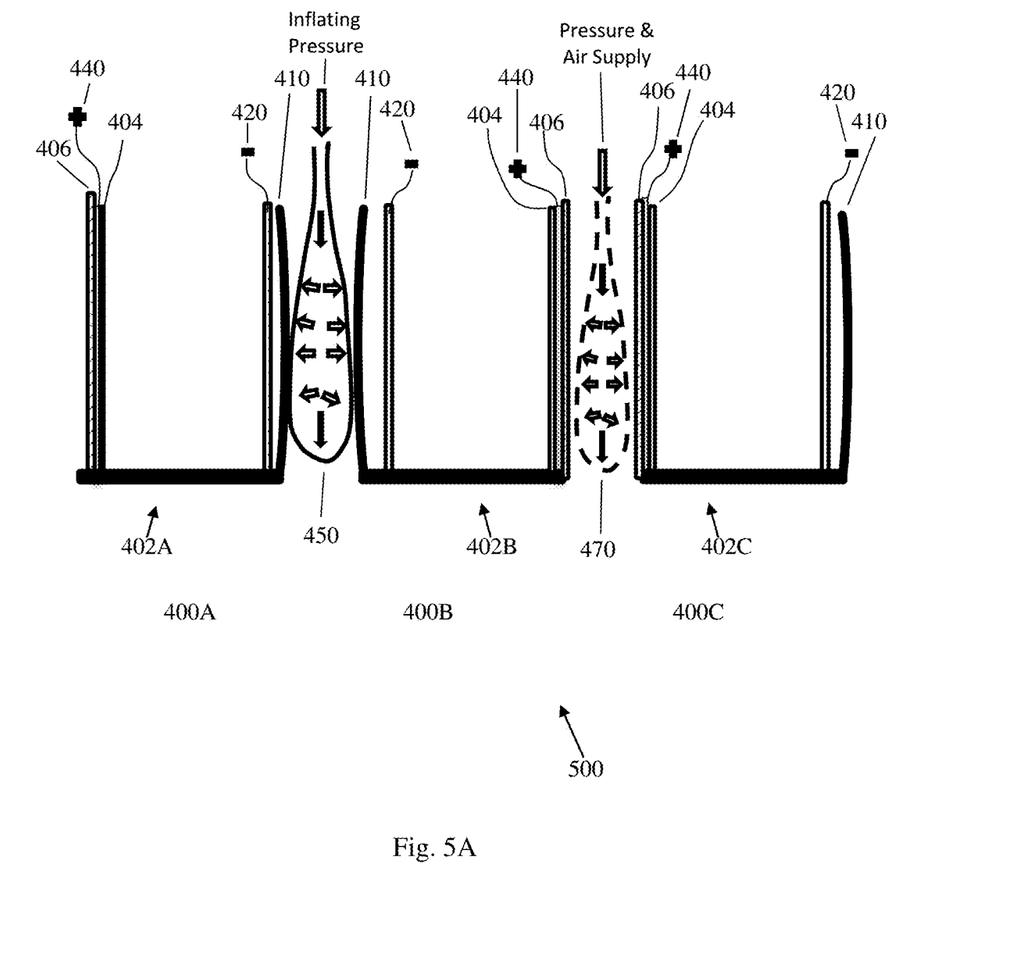
FIG. 5A schematically presents a set of metal-air cells, according to embodiments of the present invention.

Reference is made now to FIG. 5A, schematically presenting metal-air set of cells 500, according to embodiments of the present invention. Cells set 500 may comprise plurality of cells 400A, 400B, 400C etc. Elements of FIG. 5A that correspond to like elements of FIG. 4 are similar in structure and functionality. Cells 400A, 400B, 400C are each built and operative similarly to cells 400A, 400B, 400C, respectively, of FIG. 4, as described above. A substantive change between Cells set 500 and cell set 400 is the arrangement of pair of cells having their cathode aides next to each other. In cells set 500 between the cells of at least some of the pairs having with cells having their cathode sides next to each other, gas supply and counter force support means 470 may be disposed. Such means may comprise of an inflatable balloon having certain level of porosity on its envelope. The material of which the balloon is made is selected to be able to stand the level of pressure it should provide in order to provide counter-force to be exerted onto porous wall 406, for example when main pressure is provided by balloon 450. Further balloon 470 may be designed to release through its porous envelope, gas with oxygen, such as air, at a rate that is sufficient for enriching the air in air cathodes 440 with sufficient oxygen.

Figure 5B:
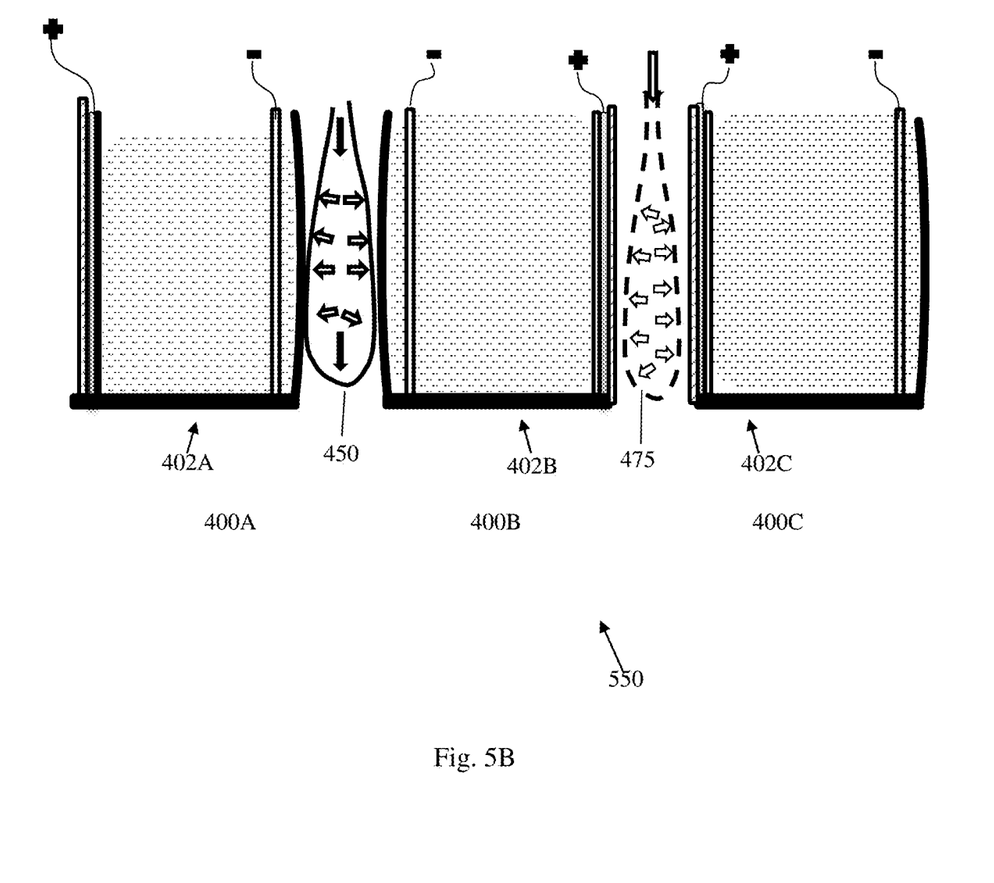
FIG. 5B schematically presents a set of metal-air cells 550, according to embodiments of the present invention.

Reference is made now to FIG. 5B, schematically presenting metal-air set of cells 550, according to embodiments of the present invention. Cells set 550 may comprise plurality of cells 400A, 400B, 400C etc. Elements of FIG. 5B that correspond to like elements of FIGS. 4 and 5A are similar in structure and functionality. Cells 400A, 400B, 400C are each built and operative similarly to cells 400A, 400B, 400C, respectively, of FIG. 5, as described above. A substantive change between Cells set 550 and cell set 500 is in that cells 400A-400C are filled with fresh electrolyte and fresh metal granules slurry. Cells set 550 is shown in a configuration that is suitable for applying pressure onto flexible walls of the cells by means of pressure providing means 450, applying counter pressure onto the porous support walls by counter force and gas supply means 475, to enable enriching relative amount of metal granules in the electrolyte in the cells, as described above.

In cells arrangement of the anode-to-cathode type pressure applying means are provided between flexible wall on one side cathode porous support wall of the adjacent cell on the other side of the pressure applying means. In this cell arrangement, the pressure applying means may be a gas/liquid sealed means capable of applying only mechanical pressure on the walls at its sides. According to yet another embodiment, pressure applying means may have one of its sides non-porous and the other side being porous, thereby this balloon may be capable of providing both pressurizing/squeezing mechanical force onto an adjacent flexible wall and counter force with oxygen enrichment gas provided to the cathode support porous wall on its other adjacent side.

Figure 6:
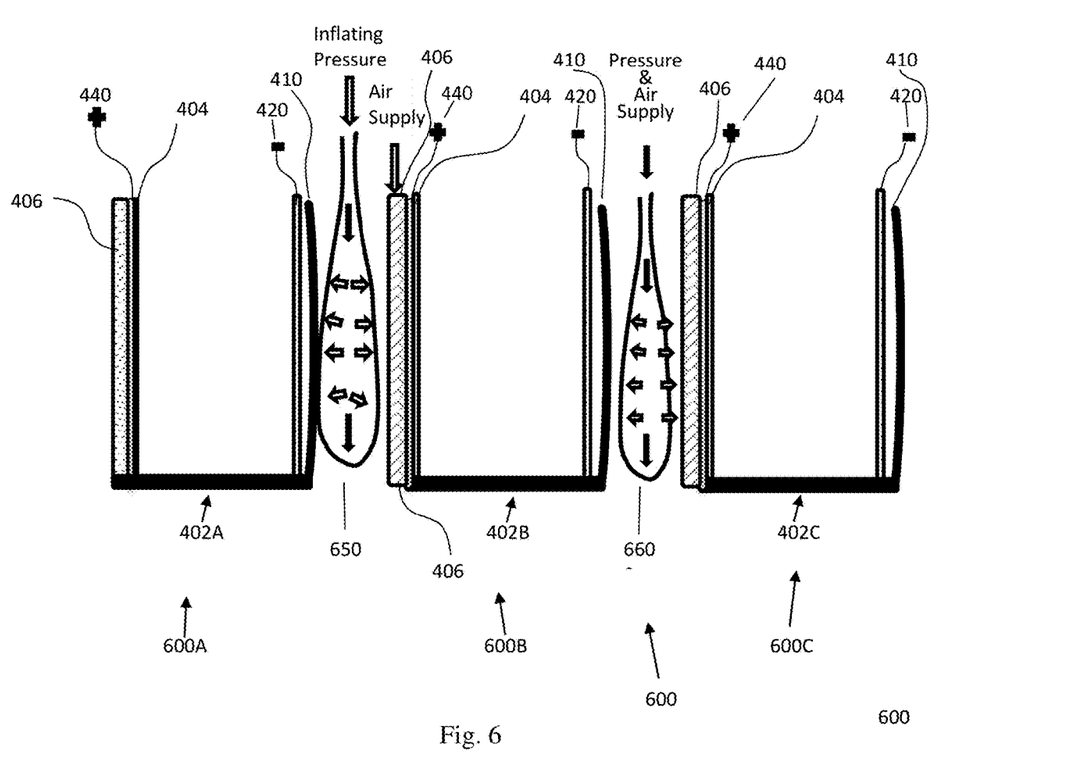
FIG. 6 schematically presents another set of metal-air cells, according to embodiments of the present invention.

Reference is made to FIG. 6 which schematically presents set of metal-air cells 600, according to embodiments of the present invention. Set 600 comprise plurality of metal-air cells 600A, 600B, 600C etc. oriented with respect to each other with the anode side of one facing the cathode side of its adjacent cell. Each of cells 600A-600C is similar in structure to cells 400A-400C of FIGS. 5A, 5B with like elements having like numerals, however having their sides facing each other differently from the arrangement of FIGS. 5A, 5B the use and role of inflatable pressurizing element elements 650, 660 is different here. Inflatable element 650 may be used to apply pressure onto flexible wall 410 of cell 600A while support wall 406 of cell 600B provides counter support to inflatable element 650 and may be fed with fresh air by air supply fed into it. Second inflatable element 660 disposed between flexible wall 10 of cell 600B and support wall 406 of cell 600C. Second inflatable element 660 may have, made in its face closer to support wall of cell 600C, plurality of small vent holes adapted to release air in a defined rate when second inflatable element 660 is inflated to provide pressure onto flexible wall, thereby providing fresh air to the cathode of cell 600C.

In one embodiment, anodes of this invention comprise zinc. In one embodiment, the anode comprises Zn and ZnO. In one embodiment, for an anode comprising particles (granules), Zn and ZnO are present in the same particle. In one embodiment, in a collection of particles used as the anode, some particles comprise Zn and others comprise ZnO. In one embodiment, Zn particles in anodes of this invention may comprise some ZnO on the surface of the particle.

In one embodiment, anodes of this invention comprise metal, metalloid, metal alloy, metal oxide or a combination thereof. In one embodiment, the metal/metalloid is selected from Zn, Fe, Sn, Si, Ge or a combination thereof. In one embodiment, the metal oxide is selected from oxides of Zn(II), Fe(II) or Fe(III), Sn(II), Si(IV), Ge(IV). In one embodiment, anodes of this invention comprise a combination of metal(s) and metal oxide(s) selected from the lists described herein above. In one embodiment, for a collection of particles, all particles comprise the same material(s). In one embodiment, for a collection of particles, the material content of some particles is different from the material content of other particles While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A metal-air cell enabling renovation of a consumed anode without dismantling the cell comprising:
   porous wall disposed at the cathode outer face of the cell and defining first outer face of the cell;
   air cathode layer adjacent the porous wall;
   separator wall disposed on the inner face of the air cathode layer;
   cell space volume to contain electrolyte and metal granules slurry;
   current collector layer to form an anode, made of current conductive material disposed in the cell space;
   flexible wall defining a second outer face of the cell; and
   an inflatable balloon disposed adjacent to an outer face of the flexible wall,
   wherein the flexible wall is adapted to be pushed towards an inside of the cell subject to pressure applied to its outer face by an inflation of the balloon, thereby to reduce the volume of the cell space.

2. The meta-air cell of claim 1 wherein the current collector layer is adapted to allow flow of electrolyte with metal granules slurry through it.

3. The meta-air cell of claim 1 wherein the porous wall is adapted to allow flow of gas containing oxygen through it.

4. The meta-air cell of claim 1 further comprising:
   opening in the cell space a volume to allow circulating flow of fluid to evacuate used slurry from the cell; and
   opening in the cell space the volume to allow flow of electrolyte with metal granules slurry to flow into the cell space volume.

5. The apparatus of the above claim 1 whereas the anode is to be renovated by means of compacting metal granules slurry onto the current collector layer.

6. The cell of claim 1 wherein the cell space volume is adapted to contain slurry composition comprising electrolyte, metal particles, metal-oxide particles and additives.

7. A metal-air cell set comprising:
a plurality of metal-air cells, each comprising at least:
porous wall disposed at the cathode outer face of the cell and defining first outer face of the cell;
air cathode layer adjacent the porous wall;
separator wall disposed on the inner face of the air cathode layer;
cell space volume to contain electrolyte and metal granules slurry;
current collector layer to form an anode, made of current conductive material disposed in the cell space; and
flexible wall defining a second outer face of the cell, wherein the flexible wall is adapted to be pushed towards inside of the cell subject to pressure applied to its outer face, thereby to reduce the volume of the cell space;
an inflatable element disposed between at least two adjacent metal-air cells, adapted to apply pressure onto the flexible wall by inflation of a balloon, thereby to reduce the volume of the cell.

8. The metal-air cell set of claim 7 wherein the inflatable element comprises in a portion of its outer envelope several cavities to enable flow of gas through them from inside of the inflatable element out.

9. The metal-air cell set of claim 7 wherein the cells are arranged so that the porous wall of one cell faces the flexible wall of the adjacent cell.

10. The metal-air cell set of claim 7 wherein the cells are arranged so that the porous wall of one cell faces the porous wall of an adjacent cell in one pair of adjacent cells and the flexible wall of one cell faces the flexible wall of an adjacent cell in another pair of adjacent cells.

* * * * *